US011102285B2

(12) United States Patent
Lakshminarayan et al.

(10) Patent No.: US 11,102,285 B2
(45) Date of Patent: Aug. 24, 2021

(54) NETWORK ROUTING TOOL

(71) Applicant: Bank of America Corporation, Charlotte, NC (US)

(72) Inventors: Muppudathy Lakshminarayan, Chennai (IN); Satish S. Kekane, Mumbai (IN); Sudheer Ganti, Hyderbad (IN)

(73) Assignee: Bank of America Corporation, Charlotte, NC (US)

( * ) Notice: Subject to any disclaimer, the term of this patent is extended or adjusted under 35 U.S.C. 154(b) by 901 days.

(21) Appl. No.: 15/399,290

(22) Filed: Jan. 5, 2017

(65) Prior Publication Data

US 2018/0191810 A1 Jul. 5, 2018

(51) Int. Cl.
*H04L 29/08* (2006.01)
*H04L 12/707* (2013.01)
*H04L 12/24* (2006.01)
*H04L 12/26* (2006.01)

(52) U.S. Cl.
CPC ........ *H04L 67/101* (2013.01); *H04L 41/0896* (2013.01); *H04L 43/0817* (2013.01); *H04L 45/22* (2013.01); *H04L 67/1027* (2013.01); *H04L 67/1029* (2013.01); *H04L 67/1031* (2013.01); *H04L 41/0681* (2013.01)

(58) Field of Classification Search
CPC ............. H04L 41/0681; H04L 41/0896; H04L 43/0817; H04L 45/22; H04L 67/101; H04L 67/1027; H04L 67/1029; H04L 67/1031
See application file for complete search history.

(56) References Cited

U.S. PATENT DOCUMENTS

| 7,512,974 B2 | 3/2009 | Callaghan et al. |
| 9,215,232 B2 | 12/2015 | Fu et al. |
| 9,288,148 B1* | 3/2016 | Krishnaswamy ... H04L 41/0893 |
| 9,578,567 B1* | 2/2017 | Laganier ............. H04L 41/0668 |
| 2005/0120093 A1* | 6/2005 | Nakano ............... G06F 11/2058 709/217 |
| 2008/0154850 A1* | 6/2008 | Evans .................. H04Q 3/0025 |
| 2008/0281833 A1* | 11/2008 | Cain ...................... G06Q 10/06 |
| 2012/0259968 A1* | 10/2012 | Anaya .................. G06F 9/5044 709/224 |

(Continued)

FOREIGN PATENT DOCUMENTS

| JP | 2013168139 A * | 8/2013 | ......... G06F 9/45533 |
| WO | WO-2015096500 A1 * | 7/2015 | ......... H04L 41/0813 |

(Continued)

*Primary Examiner* — David R Lazaro
*Assistant Examiner* — Robert A Shaw
(74) *Attorney, Agent, or Firm* — Michael A. Springs

(57) ABSTRACT

A middleware system validation tool comprising includes a retrieval engine, and a network component status engine. The retrieval engine retrieves a pre-change activity status before software is modified on a network component. The middleware system validation tool retrieves a post-change status after the software is modified and compares the pre-change status to the post-change status to determine whether the software modification was successful. The middleware system validation tool receives certification information from the network component that includes information for an SSL certificate to determine whether the SSL certificate is valid.

9 Claims, 5 Drawing Sheets

(56) References Cited

U.S. PATENT DOCUMENTS

| | | | | |
|---|---|---|---|---|
| 2013/0007503 A1* | 1/2013 | Anaya | G06F 11/2035 | 714/4.1 |
| 2013/0086280 A1* | 4/2013 | James | H04L 12/4625 | 709/238 |
| 2013/0198352 A1* | 8/2013 | Kalyanaraman | H04L 67/34 | 709/223 |
| 2013/0198355 A1* | 8/2013 | Kalyanaraman | H04L 67/34 | 709/223 |
| 2013/0262681 A1* | 10/2013 | Guo | G06F 9/5027 | 709/226 |
| 2013/0332590 A1* | 12/2013 | Mohaban | G06F 9/4806 | 709/223 |
| 2014/0029740 A1* | 1/2014 | Middleswarth | H04M 3/382 | 379/221.09 |
| 2014/0032785 A1* | 1/2014 | Chaudhuri | H04L 12/4625 | 709/238 |
| 2014/0177447 A1* | 6/2014 | Venkataswami | H04L 67/34 | 709/223 |
| 2014/0258479 A1* | 9/2014 | Tenginakai | H04L 41/0869 | 709/220 |
| 2014/0365626 A1* | 12/2014 | Radhakrishnan | G06F 9/5027 | 709/222 |
| 2015/0020059 A1* | 1/2015 | Davis | G06F 8/60 | 717/171 |
| 2015/0113537 A1* | 4/2015 | Bourbonnais | H04L 67/34 | 709/223 |
| 2015/0163161 A1* | 6/2015 | Arikatla | H04L 47/726 | 709/226 |
| 2016/0048408 A1* | 2/2016 | Madhu | G06F 11/2056 | 718/1 |
| 2016/0080195 A1* | 3/2016 | Ramachandran | H04L 47/22 | 370/220 |
| 2016/0080221 A1* | 3/2016 | Ramachandran | G06F 16/285 | 709/224 |
| 2016/0092324 A1* | 3/2016 | Young | G06F 11/2033 | 714/4.11 |
| 2016/0132576 A1* | 5/2016 | Qi | G06F 16/27 | 707/600 |
| 2016/0234059 A1* | 8/2016 | Gu | H04L 41/0668 | |
| 2016/0239396 A1* | 8/2016 | Deng | G06F 11/2007 | |
| 2016/0255144 A1* | 9/2016 | Brandwine | G06F 9/45533 | 709/226 |
| 2016/0330132 A1* | 11/2016 | Rickey | G06F 16/86 | |
| 2017/0078144 A1* | 3/2017 | Purusothaman | G06F 8/65 | |
| 2017/0093640 A1* | 3/2017 | Subramanian | H04L 41/5058 | |
| 2017/0169087 A1* | 6/2017 | Kapadia | G06F 11/20 | |
| 2017/0353544 A1* | 12/2017 | Lala | G06F 8/60 | 717/171 |
| 2018/0139269 A1* | 5/2018 | Wu | G06Q 10/06 | |
| 2018/0139273 A1* | 5/2018 | Liu | G06F 11/2056 | 718/1 |
| 2018/0159927 A1* | 6/2018 | Wu | H04L 41/5058 | |

FOREIGN PATENT DOCUMENTS

| | | | | |
|---|---|---|---|---|
| WO | WO-2017112600 A1 * | 6/2017 | | H04L 41/0813 |
| WO | WO-2017162184 A1 * | 9/2017 | | H04L 29/08 |

* cited by examiner

NETWORK ROUTING TOOL

TECHNICAL FIELD

This disclosure relates generally to computer networking and more particularly to a middleware system validation tool and a network routing tool.

BACKGROUND

Enterprises update network components in a network. For example, an enterprise may install new applications, new versions of applications, software patches, and/or updated operating systems on a network component. Enterprises may update hardware components of a network component. A network component may be taken offline to receive an update.

SUMMARY OF THE DISCLOSURE

According to an embodiment, a middleware system validation tool includes a retrieval engine, a network component engine, and a certificate validation engine. The retrieval engine retrieves a pre-change activity status from the network component. The pre-change activity status includes a pre-change instance status indicating one or more first database instances running on the network component and a pre-change virtual machine status indicating one or more virtual machines running on the network component. The retrieval engine determines whether the modification of the software is complete and receives a post-change activity status upon the determination. The network component compares the pre-change activity status and the post-change activity status to determine whether the software modification was successful. The certificate validation engine receives certificate information from the network component upon a determination that the software update is complete. The certificate information includes information for a secure sockets layer (SSL) certificate. The certificate validation engine determines whether the SSL certificate is valid.

According to another embodiment, a method includes receiving a request to modify software on a network component. The method further includes retrieving a pre-change activity status from the network component. The pre-change activity status includes a pre-change instance status indicating one or more first database instances running on the network component and a pre-change virtual machine status indicating one or more virtual machines running on the network component. The method further includes determining whether a change request status indicates that the modification of the software on the network component is complete. The method further includes receiving a post-change activity status upon a determination that the modification of the software on the network component is complete. The post-change activity status includes a post-change instance status indicating one or more second database instances running on the network component and a post-change virtual machine status indicating one or more virtual machines running on the network component. The method further includes receiving the pre-change activity status and the post-change activity status. The method further includes comparing the pre-change activity status and the post-change activity status to determine whether the software modification is successful. The method further includes receiving certificate information from the network component upon a determination that the modification of the software on the network component is complete, the certificate information including information for a secure sockets layer (SSL) certificate and determining whether the SSL certificate is valid.

According to yet another embodiment, a network routing tool includes a retrieval engine, a traffic determination engine, and a routing engine. The retrieval engine receives a change request indicating that a first datacenter will be removed from a network. The retrieval engine retrieves received traffic information from the first datacenter. The received traffic information indicates data communicated to the first datacenter. The traffic determination engine determines a first network component that communicated the data to the first datacenter. The routing engine determines a second datacenter that is connected to the network at a time when the first datacenter is scheduled to be removed from the network. The routing engine monitors the first datacenter to determine a first time when the first datacenter is removed from the network. The routing engine routes data traffic from the first network component to the second datacenter.

According to yet another embodiment, a method includes receiving a change request indicating that a first datacenter will be removed from a network. The method further includes retrieving received traffic information from the first datacenter. The received traffic information indicates data communicated to the first datacenter. The method further includes determining a first network component that communicated the data to the first datacenter. The method further includes determining a second datacenter that is connected to the network at a time when the first datacenter is scheduled to be removed from the network. The method further includes monitoring the first datacenter to determine a first time when the first datacenter is removed from the network. The method further includes routing data traffic from the first network component to the second datacenter.

Certain embodiments provide one or more technical advantages. For example, an embodiment facilitates upgrading datacenters. Some embodiments ensure that datacenters are operating correctly after an update such as a software update. As another example, an embodiment ensures that data is properly routed by determining an offline datacenter and rerouting data to an online datacenter. This example, ensures that networks are operating properly. Further, this example may reduce or eliminates data loss by preventing data from being sent to a down datacenter.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
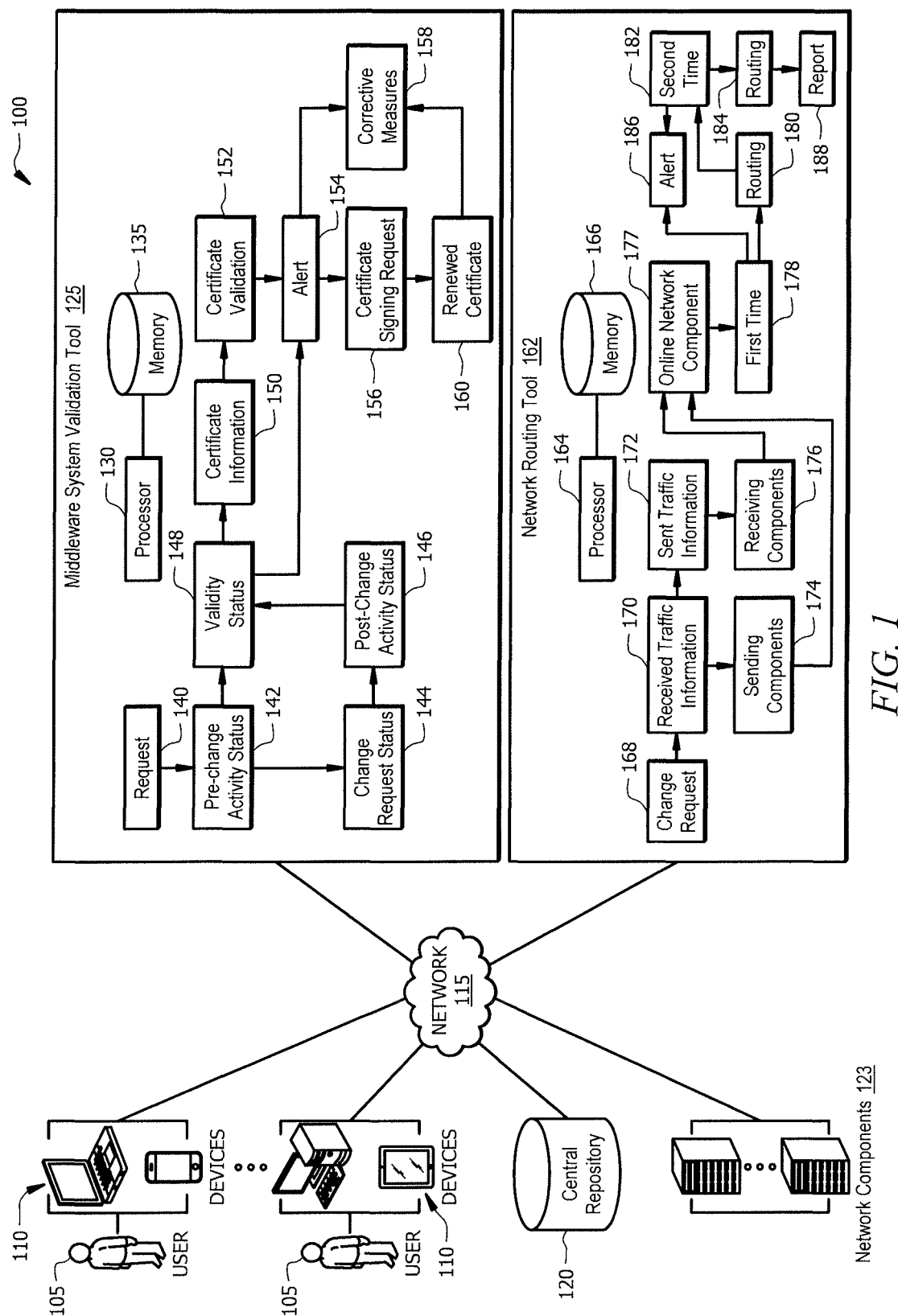
FIG. 1 illustrates a system for updating a network component.

Embodiments of the present disclosure and its advantages are best understood by referring to FIGS. 1 through 5 of the drawings, like numerals being used for like and corresponding parts of the various drawings.

Computer systems may include a plurality of components. For example, a network computer system may include a plurality of network components communicatively coupled by a network. For example, a network computer system may include routers, switches, modems, web clients, web servers, network printers, personal computers, cellular phones, databases, datacenters, and/or any other types of component that are communicatively coupled to a network. Replacing, updating, or otherwise modifying a network component in a network computer system presents several technical challenges. A network component may not function properly after it has been updated or otherwise modified. A network component may be taken offline for modification. For example, software on the network component may be updated or otherwise modified. As another example, the network component's hardware may be updated or otherwise modified. Once the modification is complete, the network component may be reconnected to the network. This approach presents technical disadvantages inherent in network computing. For example, a network component modification may not have been completed successfully. As another example, the network component may not be brought online successfully. For example, a network component may not be executing the proper software when it is brought online. These errors associated with the network component may take hours, days, or even weeks to manifest. Thus, errors in network components may not be identified or corrected until long after the network component is placed back online, if at all.

This disclosure contemplates an unconventional approach that ensures the correct operation of a network component that is brought online after being disconnected from a network. In the unconventional approach, a middleware system validation tool gathers information for the status of a network component before it is taken offline and compares it to a status of the network component after it is placed back online. The middleware system validation tool gathers the information by taking a snapshot of the network component. For example, the middleware system validation tool may determine applications that the network component is executing, virtual machines of the network component, information received and send by the network component, and/or any other suitable information indicating the state of the network component. The middleware system validation tool is configured to compare the pre and post-modification snapshots to determine whether the network component is operating properly. Under this unconventional approach, the middleware system validation tool may automatically correct errors after determining that a network component is not operating properly. The unconventional approach contemplated in this disclosure reduces or eliminates errors associated with updating a network component by automatically identifying and correcting network components that are not functioning properly.

As another example, a computer system may be unusable or suffer performance issues due to a network component being removed from the network. Updating a network component may require removing the network component from the network. For example, a datacenter may be removed from a network to undergo updates or other modifications. Datacenters generally receive, process, store, and communicate digital data. If a datacenter is offline, the datacenter may not be able to receive or communicate digital data. Thus, entire network computer systems may come to a standstill when a datacenter is taken offline. For example, network components that communicate information to a datacenter may not function properly when the datacenter is taken offline. This causes delays in communication and processing data. Furthermore, taking a datacenter offline causes network bottlenecks because the network may be required to process and communicate data from a period when the datacenter was offline, in addition to the normal data processing and communication.

The unconventional approach contemplated in this disclosure provides the technical advantage of allowing a computer network system to continue to function after a datacenter or other network component is taken offline by identifying an online datacenter or other online network component. For example, a system routing tool may determine that a first datacenter is going to be taken offline for a period of time. The system routing tool may identify a second datacenter that will be online during the period of time that the first datacenter will be offline. The network routing tool may route data traffic from the first datacenter to the second datacenter during the period of time that the first datacenter is to be taken offline. This unconventional approach provides the technical advantage of allowing a network computer system to continue to function when a datacenter is taken offline. This unconventional approach solves the technical disadvantages inherent with updating datacenters in a computer networking environment.

Figure 2:
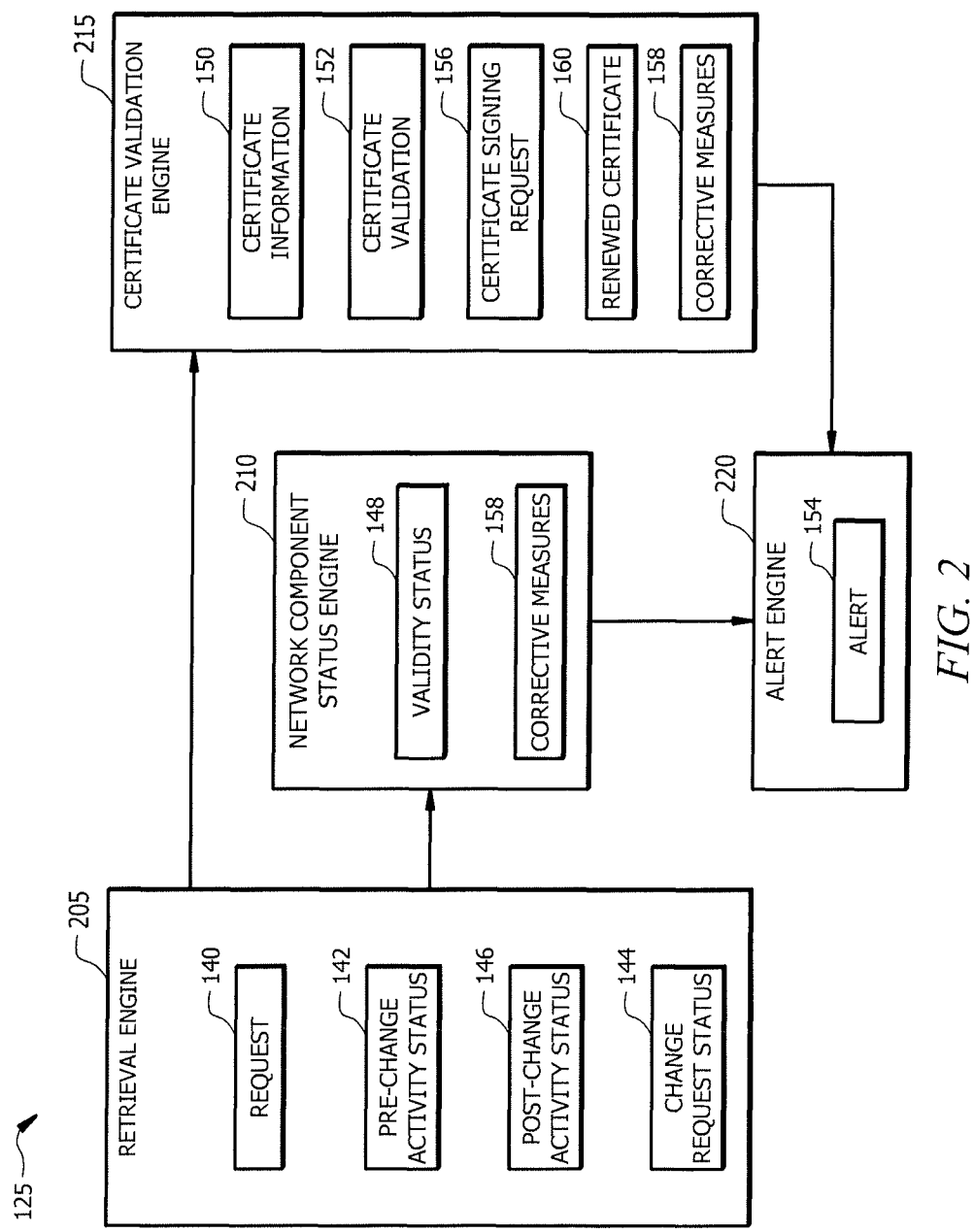
FIG. 2 illustrates the middleware system validation tool of the system 100 of FIG. 1.

The middleware system validation and network routing tools will be described in more detail using FIGS. 1 through 5. FIG. 1 will describe the tools. FIG. 2 through will describe the tools in more detail.

FIG. 1 illustrates a system 100 for updating network components. As illustrated in FIG. 1, system 100 includes one more devices 110, a network 115, a central repository 120, network components 123, a middleware system validation tool 125, and a network routing tool 162. In particular embodiments, system 100 improves the operation of a network by facilitating network component updating.

Devices 110 may be any devices that operate and/or communicate with other components of system 100. Devices 110 may be associated with an enterprise and/or business units of an enterprise. Users 105 may utilize devices 110 to communicate request 140 to middleware system validation tool 125 and/or to make a change in one or more network components 123.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Central Repository 120 may store secure sockets layer (SSL) certificates and/or any other suitable type of data. Generally, an SSL certificate facilitates creating a secure link between two or more network components 123 and/or a network component 123 and another device. In some embodiments, a network component 123 must have a valid SSL certificate for software on the network component 123 to execute properly. Central Repository 120 may communicate one or more SSL certificates to middleware system validation tool 125, one or more network components 123, and/or any other suitable component of system 100. Central Repository 120 may include a database. Central repository 120 may include single database or any suitable number of databases.

Network components 123 are devices in a network. Network components 123 may comprise a single network component 123 or any suitable number of network components 123. Network component 123 may be a router, a switch, a modem, a web client, a web server, a printer, a personal computer, a cellular phone, a database, a datacenter, and/or any other type of component that is communicatively coupled to a network. In some embodiments, network component 123 executes software. For example, network component 123 may execute an operating system, one or more applications, and/or any other suitable type of software. System 100 facilitates updating software for one or more network components 123. In some embodiments, system 100 may facilitate upgrading hardware components of a network component 123. For example, network routing tool 162 may facilitate taking a network component 123 offline to prepare the network component 123 for a hardware upgrade.

Middleware system validation tool 125 facilitates updating network components 123. As illustrated in FIG. 1, middleware system validation tool 125 includes a processor 130 and a memory 135. This disclosure contemplates processor 130 and memory 135 being configured to perform any of the operations of middleware system validation tool 125 described herein. In particular embodiments, middleware system validation tool 125 improves network functionality by facilitating upgrading of one or more network components 123. For example, an enterprise may take a network component 123 offline to perform an upgrade. When the network component 123 is brought back online, middleware system validation tool 125 may determine whether the network component 123 is operating properly. For example, middleware system validation tool 125 may compare a state of the network component 123 before going offline to a state of the network component 123 after coming back online to determine if the network component 123 is operating properly. If middleware system validation tool 125 determines that the network component 123 is not operating properly, middleware system validation tool 125 automatically performs corrective measures 158, in some embodiments.

Processor 130 is any electronic circuitry, including, but not limited to microprocessors, application specific integrated circuits (ASIC), application specific instruction set processor (ASIP), and/or state machines, that communicatively couples to memory 135 and controls the operation of middleware system validation tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of middleware system validation tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 request 140. This disclosure contemplates memory 135 storing any of the elements stored in central Repository 120 and/or by middleware system validation tool 125.

Middleware system validation tool 125 receives a request 140. Request 140 is generally a request to perform middleware system validation. For example, request 140 may include a request to ensure that one or more network components 123 are operating correctly after an update. Request 140 may be a request to perform validation for a change request 168 for one or more network components 123. As discussed in more detail below, change request 168 may include a request to modify the software on the one or more network components 123. In some embodiments, change request 168 includes a request to modify hardware components of one or more network components 123. Request 140 may be sent by one or more devices 110. Request 140 may indicate the name of one or more network components 123 to validate.

Middleware system validation tool 125 may analyze request 140 to determine one or more network components 123 to validate. Middleware system validation tool 125 may determine pre-change activity status 142 of the network component 123. Pre-change activity status 142 is generally a snapshot of the network component 123 prior to the change. For example, pre-change activity status 123 may include a pre-change instance status that indicates one or more instances of the network component 123. As another example, pre-change activity status 142 may include a pre-change virtual machine status indicating one or more virtual machines running on the network components 123. Pre-change activity status may include a processor usage of the network component 123, one or more applications running on the network component 123, SSL certificates associated with the network component 123, and/or any other suitable information for the network component 123.

Middleware system validation tool 125 monitors change request status 144. Change request status 144 generally indicates whether a change is complete. For example, change request status 144 may be a closed status. A closed status indicates whether the software and/or hardware for one or more network components 123 is updated and/or whether the one or more network components 123 are back online (e.g., re-connected to the network).

Once middleware system validation tool 125 determines that a change is complete using change request status 144, middleware system validation tool 125 determines post-change activity status 146. Post-change activity status 146 is generally a snapshot of the network component 123 after the change. For example, post-change activity status 126 may include a post-change instance status that indicates one or more instances of the network component 123. As another example, post-change activity status 142 may include a post-change virtual machine status indicating one or more virtual machines running on the network components 123. Post-change activity status may include a processor usage of the network component 123, one or more applications running on the network component 123, SSL certificates associated with the network component 123, and/or any other suitable information for the network component 123.

Middleware system validation tool 125 determines validity status 148 by comparing pre-change activity status 142 and post-change activity status 146, in some embodiments. Validity status 148 generally indicates whether the one or more changed network components 123 are operating properly after a change. For example, middleware system validation tool 125 may compare the pre-change instance status and post-change instance status of one or more network components 123 to determine whether the network component 123 is executing the proper number and/or type of instances. As another example, middleware system validation tool 125 may compare a pre-change virtual machine status and a post-change virtual machine status for one or more network components 123 to determine whether the proper virtual machines are executing on the one or more network components after the change. Middleware system validation tool 125 may compare processor usage, running applications, or any other suitable information associated with the one or more network components 123 to determine validity status 148. If validity status 148 determines that one or more network components 123 are not operating properly, middleware system validation tool 125 may generate alert 154 as discussed in more detail below.

Middleware system validation tool 125 retrieves certificate information 150 for the one or more network components 123, in some embodiments. Middleware system validation tool 125 may receive certificate information 150 after determining that a change is complete using change request status 144. Certificate information 150 generally includes information for one or more SSL certificates associated with the one or more network components 123. In some embodiments, certificate information 150 includes one or more SSL certificates. Certificate information 150 may include portions of an SSL certificate, previous SSL certificates, or any other suitable type of information.

Middleware system validation tool 125 performs certificate validation 152 using, e.g., certificate information 150. Certificate validation 152 may indicate that a SSL certificate is missing or expired. Middleware system validation tool 125 may monitor key stores to verify the validity of SSL certificates at runtime.

If validity status 148 is an invalid status or certificate validation 152 indicates that an SSL certificate is not valid, middleware system validation tool 125 may generate alert 154. In some embodiments, middleware system validation tool 125 communicates alert 154 to one or more devices 110. Alert 154 generally indicates that validity status 148 is an invalid status and/or that an SSL certificate is not valid. One or more users 105 may review alert and perform a corrective measure. For example, a user 105 may update an SSL certificate for one or more network components 123, correct hardware problems with one or more network components 123, and/or re-launch software on one or more network components 123. In some embodiments, middleware system validation tool 125 may automatically perform corrective measures, as discussed in more detail below.

In some embodiments, middleware system validation tool 125 may automatically generate certificate signing request 156. Middleware system validation tool 125 may generate certificate signing request 156 upon a determination that one or more SSL certificates are expired or otherwise invalid. Certificate signing request 156 is generally a request to receive an updated SSL certificate. For example, middleware system validation tool 125 may communicate certificate signing request 156 to one or more authorities via devices 110 and receive renewed certificate 160 in response to the request. In some embodiments, middleware system validation tool 125 may receive renewed certificate 160 from central repository 120.

Middleware system validation tool 125 may perform corrective measures 158. Corrective measures 158 generally facilitate correcting an issue with a network component 123 after a change in the network component 123. In some embodiments, middleware system validation tool 125 automatically performs corrective measures 158 upon a determination that validity status 148 is an invalid status. For example, if middleware system validation tool 125 determines that a virtual machine was operating on a network component 123 prior to a change to the network component 123 but not after the change, middleware system validation tool 125 may automatically launch the virtual machine. As another example, middleware system validation tool 125 may launch an instance on a network component 123. Corrective measures 158 may include launching an application on a network component 123. In some embodiments, corrective measures 158 may include automatically retrieving a valid SSL certificate when certificate validation 152 indicates that an SSL certificate is expired or otherwise invalid.

Network routing tool 162 facilitates updating network components 123. As illustrated in FIG. 1, network routing tool 162 includes a processor 164 and a memory 166. This disclosure contemplates processor 164 and memory 166 being configured to perform any of the operations of network routing tool 162 described herein. In particular embodiments, network routing tool 162 improves network functionality by facilitating upgrading one or more network components 123. For example, a network component 123 may be taken offline to perform an upgrade or other change to the network component 123. In some embodiments, the network component 123 receives and/or communicates data traffic. When the network component 123 is taken offline, it may be unable to receive and/or communicate data traffic. Network routing tool 162 facilitates proper network operation by routing traffic to and/or from the offline network component 123 to and/or from a network component 123 that is online.

Processor 164 is any electronic circuitry, including, but not limited to microprocessors, application specific integrated circuits (ASIC), application specific instruction set processor (ASIP), and/or state machines, that communicatively couples to memory 166 and controls the operation of network routing tool 162. Processor 164 may be 8-bit, 16-bit, 32-bit, 64-bit or of any other suitable architecture. Processor 164 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 164 may include other hardware and software that operates to control and process information. Processor 164 executes software stored on memory to perform any of the functions described herein. Processor 164 controls the operation and administration of network routing tool 162 by processing information received from network 115, device(s) 110, and memory 166. Processor 164 may be a programmable logic device, a microcontroller, a microprocessor, any suitable processing device, or any suitable combination of the preceding. Processor 164 is not limited to a single processing device and may encompass multiple processing devices.

Memory 166 may store, either permanently or temporarily, data, operational software, or other information for processor 164. Memory 166 may include any one or a combination of volatile or non-volatile local or remote devices suitable for storing information. For example, memory 164 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 166, a disk, a CD, or a flash drive. In particular embodiments, the software may include an application executable by processor 164 to perform one or more of the functions described herein. This disclosure contemplates memory 166 storing any of the elements stored in central Repository 120 and/or by network routing tool 162.

Network routing tool 162 receives change request 168. Change request 168 is generally a request to make a change to one or more network components 123. Change request 168 may include a request to modify the software on the one or more network components 123. In some embodiments, change request 168 is a request to modify hardware components of the one or more network components 123. This disclosure may refer to the network component 123 identified in change request 168 to make a change as a changed network component 123. Performing a change in response to change request 168 may require the one or more network components 123 to be taken offline. Thus, change request 168 may include a request to remove network component 123 from a network. While the network components 123 are offline, the network components may be unable to send and/or receive data traffic, in some embodiments. Change request 168 may be sent by one or more devices 110. Change request 168 may indicate the name of one or more network components 123 to validate.

Network routing tool 162 may determine one or more network components 123 to be changed using, e.g., change request 168 and retrieve received traffic information 170 and sent traffic information 172 from the one or more network components 123. In some embodiments, network components 123 send, receive, store, and/or are otherwise associated with data traffic. For example, a datacenter may receive and store data. As another example, a router may send and/or receive data. Traffic information is generally information for data associated with a network component 123. For example, traffic information for a network component 123 may identify devices sending data to and/or receiving data from the network component 123. Traffic information may include the types of data associated with network component 123. In some embodiments, traffic information may include an amount of data associated with network component 123. Traffic information may include any other suitable information for data associated with a network component 123. Received traffic information 170 is traffic information for data received by one or more network components 123. Sent traffic information 172 is traffic information for data sent by one or more network components 123.

Network routing tool determines sending components 174 using received traffic information 170 and determines receiving components 176 using sent traffic information 172. In some embodiments, sending components 174 and receiving components 176 are each a subset of network components 123. Sending components 174 may be components that communicate received traffic to network components 123 identified in change request 168. Receiving components 176 may be components that receive sent traffic from network components 123 identified in change request 168. In some embodiments, network routing tool 162 extracts sending components 174 from received traffic information 170. Network routing tool 162 may extract receiving components 176 from sent traffic information 172.

Network routing tool 177 determines online network component 177. Online network component 177 is generally a network component 123 that remains online while the changed network component 123 is taken offline for an upgrade or other change. In some embodiments, network routing tool 162 determines online network component 177 using change request 168. For example, change request 168 may identify online network component 177. As another example, network routing tool 162 may use the changed network component 123 identified in change request 168 to determine online network component 177. For example, if the changed network component 123 is a datacenter, network routing tool 162 may identify another datacenter as online network component 177. Network routing tool 162 may use other information for the changed network component 123 to determine online network component 177. For example, network routing tool 162 may use a brand, a version, a capacity, or any other type of functionality of a changed network component 123 to determine online network component 177. As another example, network routing tool 162 may determine a data type sent, received, and/or stored by the changed network component 123 and determine online network component 177 based on the datatype.

Network routing tool 162 monitors the changed network component 123 to determine first time 178. First time 178 is a time that the changed network component 123 goes offline. For example, the changed network component 123 may be taken offline to perform upgrades or other changes to the changed network component 123 in response to change request 168. Once, network routing tool 162 determines first time 178, network routing tool 162 performs routing 180 by routing data to and/or from the changed network component 123 to online network component 177. This allows the network to function properly without the changed network component 123. For example, network data may still be sent and stored without each network component 123 being online. This allows network components 123 to be upgraded or otherwise changed while reducing or eliminating network downtime.

Network routing tool 168 monitors the changed network component 123 to determine second time 182. Second time 182 is a time after first time 178 that the changed network component 123 goes back online, in some embodiments. Once network routing tool 162 determines that the changed network component 123 is back online, network routing tool performs routing 184. Routing 184 generally restores network data traffic back to its original state (e.g., the state before routing 180). Thus, the network is operating in a similar way prior to the change of the changed network component 123.

In some embodiments, network routing tool 162 generates alert 186. Network routing tool 162 may generate alert 186 at first time 178 and/or second time 182. Alert 186 may indicate that the changed network component is taken offline (e.g., at first time 178) and/or that the changed network component is placed back online (e.g., at second time 182). Network routing tool 162 may communicate alert 186 to devices 110. User 105 may view the alert to determine that the changed network component 123 is taken offline and/or that the changed network component 123 is placed back online. Alert 186 may facilitate determining when a change is taking place and when a change is complete.

Network routing tool 162 may generate report 188. Report 188 generally includes information relating to the change of the changed network component 123. Report 188 may indicate sending components 174, receiving components 176, online network component 177, first time 178, and second time 182. Network routing tool 162 may communicate report 188 to one or more user devices 110. One or more users 105 may review report 188 to determine where network data was routed between first time 178 and second time 182. One or more users may review report 188 to determine when then change took place (e.g., by viewing first time 178 and/or second time 182).

Modifications, additions, or omissions may be made to system 100 without departing from the scope of the invention. For example, system 100 may include any number of processors 130/164, memory 135/166, devices 110, and/or central repositories 120. As yet another example, components of system 100 may be integrated or separated. For example, middleware system validation tool 125 and network routing tool 162 may be combined as a single tool. As another example, in particular implementations, memory 135 and/or memory 166 may be separated into multiple memories 135 and or memories 166 to store the data descried herein. Although generally described as traffic, network traffic, or data traffic, this disclosure contemplates network routing tool 162 routing any suitable type of information communicated or stored within a network.

FIG. 2 illustrates the middleware system validation tool 125 of the system 100 of FIG. 1. As illustrated in FIG. 2, middleware system validation tool 125 includes retrieval engine 205, network component status engine 210, certificate validation engine 215, and alert engine 220. In particular embodiments, middleware system validation tool 125 facilitates updating network components 123. For example, user 105 may communicate a change request 168 for one or more network components 123. A change request 168 may include a request to update one or more network components 123 to include a new application, a new version of an application, a software patch update, and/or an updated operating system. A change request 168 may include a request to upgrade or otherwise modify one or more software or hardware components of one or more network components 123. Middleware system validation tool 125 analyzes the one or more network components 123 prior to the change and after the change to ensure that the one or more network components 123 are operating properly after the change.

Retrieval engine 200 receives request 140, pre-change activity status 142, post-change activity status 146, and/or change request status 144. In particular embodiments, retrieval engine 200 receives request 140 from one or more devices 110. Request 140 may comprise a request to perform middleware system validation for one or more network components 123 in response to a change request 168. Retrieval engine 205 retrieves pre-change activity status 142 in response to request 140. Retrieval engine 205 monitors change request status 144. After change request status 144 indicates that a change is complete in network component 123, retrieval engine 205 may retrieve post-change activity status 146 from network component 123. An example algorithm for retrieval engine 200 is as follows: wait for request 140; receive request 140 from one or more devices 110; in response to receiving request 140, retrieve pre-change activity status 142 from network component 123; retrieve and monitor change request status 144 from network component 123; and retrieve post-change activity status 146 upon a determination that a change is complete; and communicate pre-change activity status 142 and post-change activity status 144 to network component status engine 210.

Network component status engine 210 retrieves pre-change activity status 142 and post-change activity status 146 and generates validity status 148 and corrective measures 158, in some embodiments. For example, network component status engine 210 may determine validity status 148 by comparing pre-change activity status 142 and post-change activity status 146. In some embodiments, validity status 148 is one of valid and invalid. An invalid validity status 148 may indicate that a network component 123 is not operating properly. For example, a network component 123 may not be executing a virtual machine and/or an instance after the change that the network component 123 was executing before the change. An example algorithm for network component status engine 210 to generate validity status 148 is as follows: receive pre-change activity status 142; and receive post-change activity status 146; compare pre-change activity status 142 and post-change activity status 146 to generate validity status 148.

Network component status engine 210 may perform one or more corrective measures 158 in response to validity status 148 being an invalid status. In some embodiments, network component status engine 210 may determine, using validity status 148, that a virtual machine was running on a network component 123 before a change to the network component 123, but not after the change to the network component 123. In this embodiment, corrective measures 158 may include automatically launching the virtual machine on the network component 123. Similarly, network component status engine 210 may automatically launch an instance an application, or any other software upon a determination the network component is not executing the software after a change. An example algorithm for network component status engine 210 performing corrective measure 158 is as follows: parse validity status 148; determine that software is not executing on one or more network components 123; and automatically launch the software in response to the determination.

Middleware system validation tool 125 may include certificate validation engine 215 in some embodiments. Certificate validation engine 215 may receive certificate information 150 from one or more network components 123 upon a determination that a change request status is a closed status (e.g., a change to one or more network components 123 is complete). As discussed, certificate information 150 generally includes information for a SSL certificate. Certificate validation engine 215 may use certificate information 150 to perform certificate validation 152. Certificate validation 152 determines whether one or more SSL certificates is valid. For example, certificate validation engine 215 may determine whether an SSL certificate is expired. An example algorithm for certificate validation engine 215 performing certificate validation is as follows: Retrieve certificate information 150 from one or more network components 123; and perform certificate validation using certificate information 150.

Middleware system validation tool 125 may generate certificate signing request 156 and receive renewed certificate 160 in some embodiments. For example, if certificate validation engine 215 determines, using certificate validation 152, that an SSL certificate is invalid, certificate validation engine 215 may generate certificate signing request 156 and communicate certificate signing request 156 to an authority In some embodiments an authority is a user 105. For example, certificate validation engine 215 may communicate certificate signing request 156 to device 110 via network 115. In some embodiments, certificate validation engine 215 may receive renewed certificate 160 in response to certificate signing request 156. Renewed certificate 160 may be a valid SSL certificate. In some embodiments, certificate validation engine 215 may perform one or more corrective measures 158. Corrective measures 158 may include communicating a valid SSL certificate, such as renewed certificate 160 to one or more network components 123. In some embodiments, certificate validation engine 215 may automatically retrieve a new SSL certificate from central repository 120 upon a determination that an SSL certificate is invalid. An example algorithm for certificate validation engine 215 is as follows: generate certificate signing request 156 in response to a determination that a certificate 152 is invalid; communicate certificate signing request 156 to devices 110; receive renewed certificate 160 in response to certificate signing request 156; and perform corrective measures 158 by communicating valid SSL certificate to one or more network components 123.

In some embodiments, middleware system validation tool 125 includes alert engine 220. Alert engine 220 generates alert 154 in response to determining that validity status 148 is an invalid status and/or upon a determination that certificate validation 152 indicates that an SSL certificate is invalid. Alert engine 220 communicates alert 154 to devices 110, in some embodiments. User 105 may view alert 154 using device 110 and correct one or more network components 123. In some embodiments, alert engine 220 may only generate and/or communicate alert 154 if middleware system validation tool 125 cannot or does not perform corrective measures 158 to automatically correct an issue. An example algorithm for alert engine 220 is as follows: receive validity status 148; determine whether validity status 148 is an invalid status; receive certificate validation 152 results; determine whether there is an invalid SSL certificate; generate alert 154 upon a determination that validity status 148 is an invalid status or there in an invalid SSL certificate; and communicate alert 154 to device 110.

Modifications, additions, or omissions may be made to middleware system validation tool 125 depicted in FIG. 2. Middleware system validation tool 125 may determine validity status 148 and/or certificate validation 152 for a single network component 123 or any suitable network components 123. For example, a similar change may be made to a plurality of network components 123, and middleware system validation tool 125 may determine validity status 148 and/or certificate validation 152 for each of the network components.

Figure 3:
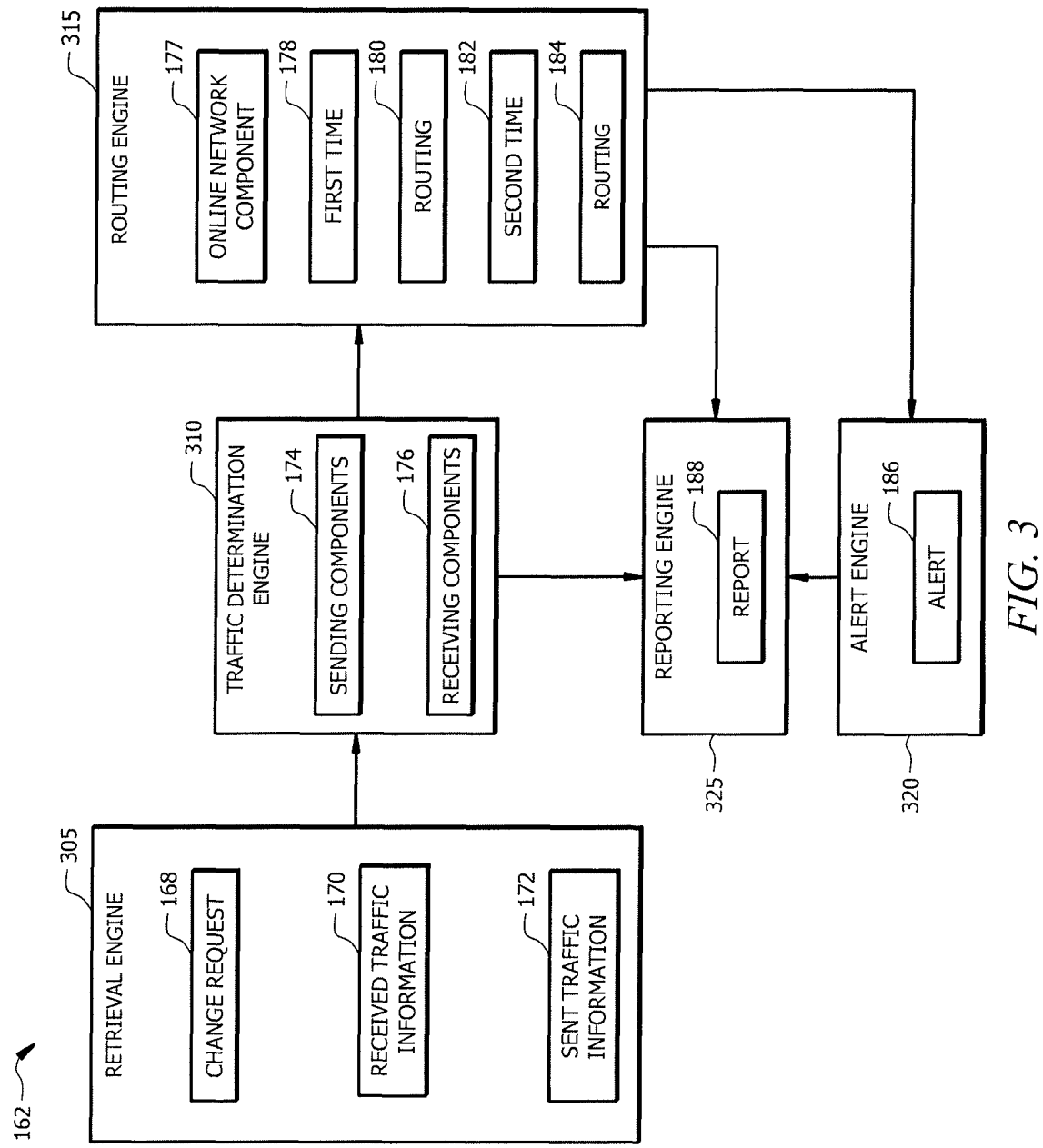
FIG. 3 illustrates the network routing tool of the system 100 of FIG. 1.

FIG. 3 illustrates the network routing tool 162 of the system 100 of FIG. 1. As illustrated in FIG. 3, network routing tool 162 includes retrieval engine 305, traffic determination engine 310, routing engine 315, alert engine 320, and reporting engine 325. In particular embodiments, network routing tool 162 facilitates updating network components 123. For example, a user 105 may communicate a change request 168 for a network component 123. A change indicated by change request 168 may require removing the network component 123 from the network. Network routing tool 162 ensures that the network operates properly while the network component 123 is offline.

Retrieval engine 305 may receive change request 168 and retrieve traffic information in response to change request 168. Traffic information may include received traffic information 170 and sent traffic information 172, as previously discussed. Retrieval engine 305 may parse change request 168 to determine a network 123 to be changed. Retrieval engine 305 may retrieve traffic information based on the network component 123. An example algorithm for retrieval engine 305 is as follows: receive change request 168; determine a network component 123 indicated in change request 168; retrieve received traffic information 170 for the network component 123 in response to change request 168; retrieve sent traffic information 172 for the network component 123 in response to change request 168; and communicate received traffic information 170 and sent traffic information 172 to traffic determination tool 310.

Traffic determination engine 310 receives received traffic information 170 and sent traffic information 172, in some embodiments. Traffic determination engine 310 may determine sending components 174 using received traffic information 170. For example, traffic determination engine 310 may parse received traffic information 170 to determine sending components 174. Traffic determination engine 310 may determine receiving components 176 using sent traffic information 172. For example, traffic determination engine 310 may parse traffic information 172 to determine receiving components 176. An example algorithm for traffic determination engine 310 is as follows: receive received traffic information 170; determine sending components 174 using received traffic information 170; receive sent traffic information 172; determine receiving components 176 using sent traffic information 172; and communicate sending components 174 and receiving components 176 to routing engine 315.

Routing engine 315 generally performs routing 180 and routing 184. In some embodiments, routing engine 315 determines online network component 177. As discussed, online network component 177 may be a component that is connected to the network at a time when the changed network component 123 is scheduled to be removed from the network. Routine engine 315 monitors the changed network component to determine first time 178. In some embodiments, change request 168 may include first time 178, and routing engine 315 may determine first time 178 using change request 168. At first time 178, or within ten minutes of first time 178, routing engine 315 performs routing 180. As previously discussed, routing 180 includes routing traffic/from to online network component 177 while the changed network component 123 is offline. Routine engine 315 monitors the changed network component 123 for second time 182 indicating that the network component 123 is connected to the network component. Second time 182 is after first time 178. At, or within ten minutes of, second time 182, routing engine 315 performs routing 184 to route traffic back to its original state (e.g., to/from the changed network component 123). An example algorithm for routing engine 315 is as follows: receive change request 168, sending components 174, and receiving components 176; determine online network component 177; determine first time 178; perform routing 180 at, or within ten minutes of, first time 178; determine second time 182; and perform routing 182 at, or within ten minutes of, second time 182.

Alert engine 320 generates alert 186, in some embodiments. Alert engine 320 may generate alert 186 at first time 178 and/or second time 182. Alert engine 320 may communicate alert 186 to devices 110. An example algorithm for alert engine 320 is as follows: receive first time 178 from routing engine 315; generate alert 186 in response to first time 178 communicate alert 186 to devices 110; receive second time 182 from routing engine 315; generate alert 186 in response to second time 182; communicate alert 186 to devices 110.

Reporting engine 325 generates report 188, in some embodiments. As previously discussed, report 188 may indicate sending components 174, receiving components 176, online network component 177, first time 178, second time 182, and/or alert 186. Reporting engine 325 may communicate report 188 to devices 110. An example algorithm for reporting engine 325 is as follows: receive sending components 174 and receiving components 176 from traffic determination engine 310; receive online network component 177, first time 178, and second time 182 from routing engine 315; receive alert 186 from alert engine 320; use sending components 174, receiving components 176, online network component 177, first time 178, second time 182, and/or alert 186 to generate report 188; and communicate report 188 to devices 110.

Figure 4:
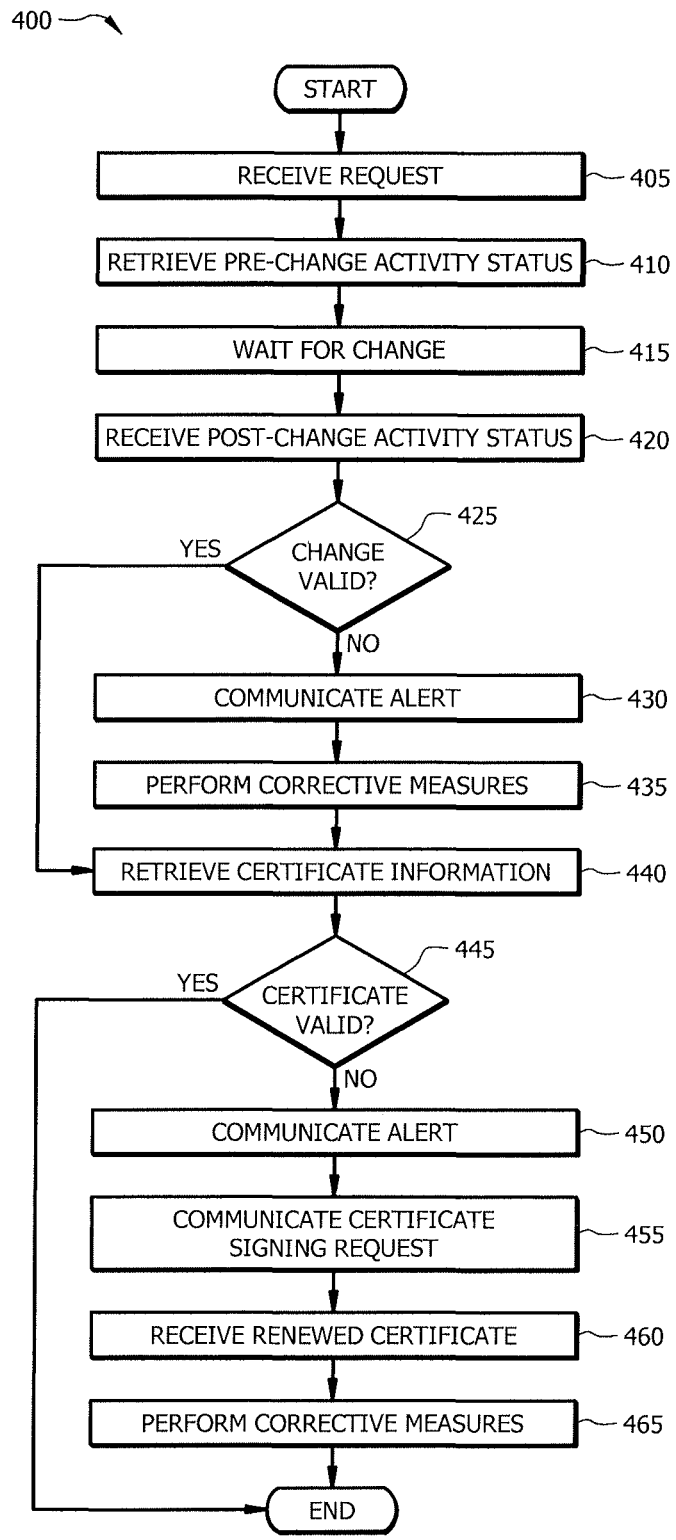
FIG. 4 is a flowchart illustrating a method for middleware system validation using the system 100 of FIG. 1.

FIG. 4 is a flowchart illustrating a method 400 for facilitating updating one or more network components 123 using the system 100 of FIG. 1. In particular embodiments, middleware system validation tool 125 performs method 400. By performing method 400, middleware system validation tool 125 improves network functionality by facilitating upgrading network components.

Middleware system validation tool 125 begins by receiving request 140 to perform middleware system validation at step 405, in some embodiments. Middleware system validation tool 125 retrieves pre-change activity status 142 from network component 123 in response to request 140 at step 410. Middleware system validation tool 125 determines change status request 144 at step 415. Middleware system validation tool 125 may not proceed to step 420 until it determines that a change to network component 123 is complete. Once a change is complete, method 400 proceeds to step 420 where middleware system validation tool 125 retrieves post-change activity status 146 from network component 123.

Middleware system validation tool 125 determines validity status 148 at step 425. If validity status 148 is a valid status, method 400 proceeds to step 400. Otherwise method 400 proceeds to step 430 where middleware system validation tool 125 generates alert 154 and communicates alert 154 to one or more devices 110. Middleware system validation tool 125 may automatically perform corrective measures 158 at step 435. As discussed, corrective measures 158 may include launching software on network component 123.

Middleware system validation tool 125 retrieves certificate information 150 from network device 123 at step 440, in some embodiments. Middleware system validation tool 125 may use certificate information 150 to determine whether a certificate is valid at step 445. If the certificate is valid, method 400 ends.

If middleware system validation tool 125 determines that one or more certificates is not valid in step 445, method 400 proceeds to step 450 where middleware system validation tool 125 generates alert 154 and communicates alert 154 to one or more devices 110. Middleware system validation tool 125 generates certificate signing request 156 and communicates certificate signing request 156 to one or more devices 110 at step 455. Middleware system validation tool 125 receives renewed certificate 160 in response to certificate signing request 156 at step 460. Middleware system validation tool 125 may automatically perform corrective measures 158 at step 465. As previously discussed, corrective measures 158 may include communicating renewed certificate 160 to network component 123.

Modifications, additions, or omissions may be made to method 400 depicted in FIG. 4. Method 400 may include more, fewer, or other steps. For example, steps may be performed in parallel or in any suitable order. While method 400 discusses middleware validation tool 125 performing middleware validation for a single network component 123, middleware validation tool 125 may perform middleware validation for any suitable number of network components 123 in response to request 140. While discussed as middleware system validation tool 125 performing the steps, any suitable component of system 100, such as device(s) 110 and/or network routing tool 162 for example, may perform one or more steps of the method.

Figure 5:
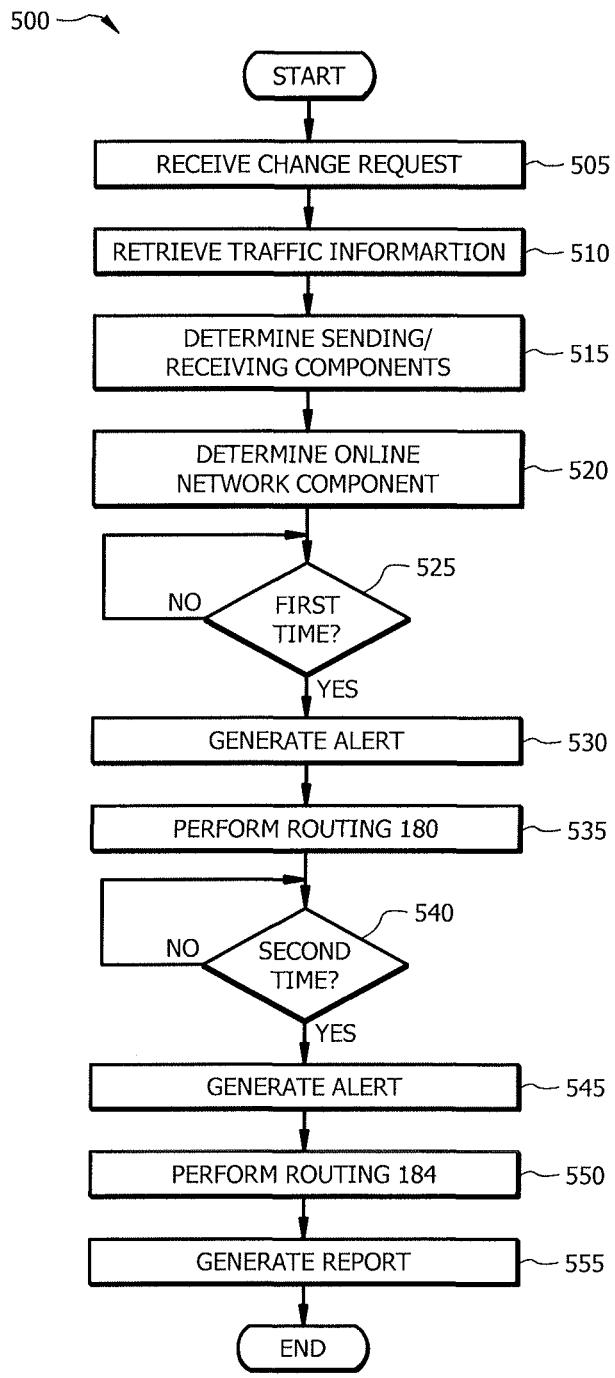
FIG. 5 is a flowchart illustrating a method for network routing using the system 100 of FIG. 1.

FIG. 5 is a flowchart illustrating a method 500 for facilitating network routing using the system 100 of FIG. 1. In particular embodiments, network routing tool 162 performs method 500. By performing method 500, network routing tool 162 improves network functionality by facilitating upgrading network components.

Method 500 begins at step 505 where network routing tool 162 receives change request 168. Network routing tool 162 may retrieve traffic information from one or more network components 123 at step 510. Traffic information may include received traffic information 170 and sent traffic information 172. Network routing tool 162 may determine sending components 174 and receiving components 176 using traffic information at step 515.

At step 520, network routing tool 162 determines online network component 177. Network routing tool 162 determines first time 178 at step 525. As illustrated, network routing tool 162 may determine that first time 178 has passed before proceeding to step 530 where network routing tool 162 generates alert 186. Network routing tool 162 performs routing 180 at step 535. Network routing tool 162 determines second time 182 at step 540. As illustrated, network routing tool 162 may wait until second time 182 before generating alert 186 at step 545 and performing routing 184 at step 550. Network routing tool 162 may generate report 188 at step 555 before method 500 ends.

Modifications, additions, or omissions may be made to method 500 depicted in FIG. 5. Method 500 may include more, fewer, or other steps. For example, steps may be performed in parallel or in any suitable order. While method 500 discusses network routing tool 162 performing routing 180 and routing 184 for a single network component 123, network routing tool 162 may perform routing for any suitable number of network components 123. While discussed as network routing tool 162 performing the steps, any suitable component of system 100, such as device(s) 110 and/or middleware system validation tool 125 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A network routing tool comprising a memory and a hardware processor configured to:
  receive a change request indicating that a first datacenter will be removed from a network so that a hardware component of the first datacenter can be modified, wherein the change request indicates a period of time when the first datacenter will be removed from the network;
  in response to receiving the change request, retrieve received traffic information from the first datacenter, wherein the received traffic information indicates data communicated to the first datacenter;
  identify a first network component that sent data to the first datacenter based on the received traffic information;
  retrieve sent traffic information from the first datacenter, wherein the sent traffic information indicates data communicated by the first datacenter;
  identify a second datacenter that received data from the first datacenter based on the sent traffic information;
  determine to reroute data traffic between the first network component and the second datacenter when the first datacenter is removed from the network;
  determine a version of the first datacenter, a capacity of the first datacenter, and a data type sent or received by the first datacenter;
  select a third datacenter from among a plurality of datacenters based on the change request, the version of the first datacenter, the capacity of the first datacenter, and the data type sent or received by the first datacenter, wherein the third datacenter is configured to remain online when the first datacenter is removed from the network;
  monitor the first datacenter to determine a first time when the first datacenter is removed from the network;
  capture a first snapshot of the first network component prior to the first time;
  at the first time, reroute data traffic from the first network component to the third datacenter;
  route the data traffic from the third datacenter to the second datacenter;
  monitor the first datacenter to determine a second time when the first datacenter is re-connected to the network, wherein the second time is after the first time;
  capture a second snapshot of the first network component at the second time;
  compare the first snapshot to the second snapshot to determine whether a modification of the hardware component is valid;
  at the second time, reroute data traffic from the first network component to the first datacenter;
  generate a first alert at the first time indicating that the first datacenter is removed from the network; and
  generate a second alert at the second time indicating that the first datacenter is re-connected to the network.

2. The network routing tool of claim 1, wherein the first network component is one of a router, a switch, a modem, a web client, a web server, a printer, a personal computer, and a cellular phone.

3. The network routing tool of claim 1, wherein the memory and the hardware processor are further configured to generate a report indicating the received traffic information and the second datacenter.

4. A method comprising:
  receiving a change request indicating that a first datacenter will be removed from a network so that a hardware component of the first datacenter can be modified, wherein the change request indicates a period of time when the first datacenter will be removed from the network;
  in response to receiving the change request, retrieving received traffic information from the first datacenter, wherein the received traffic information indicates data communicated to the first datacenter;
  identifying a first network component that sent data to the first datacenter based on the received traffic information;
  retrieving sent traffic information from the first datacenter, wherein the sent traffic information indicates data communicated by the first datacenter;
  identifying a second datacenter that received data from the first datacenter based on the sent traffic information;
  determining to reroute data traffic between the first network component and the second datacenter when the first datacenter is removed from the network;
  determining a version for the first datacenter, a capacity for the first datacenter, and a data type sent or received by the first datacenter;
  selecting a third datacenter from among a plurality of datacenters based on the change request, the version of the first datacenter, the capacity of the first datacenter, and the data type sent or received by the first datacenter, wherein the third datacenter is configured to remain online when the first datacenter is removed from the network;
  monitoring the first datacenter to determine a first time when the first datacenter is removed from the network;
  capturing a first snapshot of the hardware component of the first datacenter prior to the first time;
  at the first time, rerouting data traffic from the first network component to the third datacenter;
  routing the data traffic from the third datacenter to the second datacenter;
  monitoring the first datacenter to determine a second time when the first datacenter is re-connected to the network, wherein the second time is after the first time;
  capturing a second snapshot of the hardware component of the first datacenter at the second time;
  comparing the first snapshot to the second snapshot to determine whether a modification of the hardware component is valid;

at the second time, rerouting data traffic from the first network component to the first datacenter;
generating a first alert at the first time indicating that the first datacenter is removed from the network; and
generating a second alert at the second time indicating that the first datacenter is re-connected to the network.

5. The method of claim 4, wherein the first network component is one of a router, a switch, a modem, a web client, a web server, a printer, a personal computer, and a cellular phone.

6. The method of claim 4, further comprising generating a report indicating the received traffic information and the second datacenter.

7. A system comprising:
a plurality of datacenters that comprises a first datacenter comprising a hardware component; and
a network routing tool comprising a memory and a hardware processor configured to:
  receive a change request indicating that the first datacenter will be removed from a network so that the hardware component of the first datacenter can be modified, wherein the change request a period of time when the first datacenter will be removed from the network;
  in response to receiving the change request, retrieve received traffic information from the first datacenter, wherein the received traffic information indicates data communicated to the first datacenter;
  identify a first network component that sent data traffic to the first datacenter based on the received traffic information;
  retrieve sent traffic information from the first datacenter, wherein the sent traffic information indicates data communicated by the first datacenter;
  identify a second datacenter from among the plurality of datacenters that received data from the first datacenter based on the sent traffic information;
  determine to reroute data traffic between the first network component and the second datacenter when the first datacenter is removed from the network;
  determine a version of the first datacenter, a capacity of the first datacenter, and a data type sent or received by the first datacenter;
  select a third datacenter from among the plurality of datacenters based on the change request, the version of the first datacenter, the capacity of the datacenter, and the data type sent or received by the first datacenter, wherein the third datacenter is configured to remain online when the first datacenter is removed from the network;
  monitor the first datacenter to determine a first time when the first datacenter is removed from the network;
  capture a first snapshot of the hardware component of the first datacenter prior to the first time;
  at the first time, reroute data traffic from the first network component to the third datacenter;
  route the data traffic from the third datacenter to the second datacenter;
  monitor the first datacenter to determine a second time when the first datacenter is re-connected to the network, wherein the second time is after the first time;
  capture a second snapshot of the hardware component of the first datacenter at the second time;
  compare the first snapshot to the second snapshot to determine whether a modification of the hardware component is valid;
  at the second time, reroute data traffic from the first network component to the first datacenter;
  generate a first alert at the first time indicating that the first datacenter is removed from the network; and
  generate a second alert at the second time indicating that the first datacenter is re-connected to the network.

8. The system of claim 7, wherein the first network component is one of a router, a switch, a modem, a web client, a web server, a printer, a personal computer, and a cellular phone.

9. The system of claim 7, wherein the memory and the hardware processor are further configured to generate a report indicating the received traffic information and the second datacenter.

\* \* \* \* \*